(12) United States Patent
Davis et al.

(10) Patent No.: US 7,010,649 B2
(45) Date of Patent: Mar. 7, 2006

(54) PERFORMANCE OF A CACHE BY INCLUDING A TAG THAT STORES AN INDICATION OF A PREVIOUSLY REQUESTED ADDRESS BY THE PROCESSOR NOT STORED IN THE CACHE

(75) Inventors: Gordon Taylor Davis, Chapel Hill, NC (US); Thomas Basilio Genduso, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 10/685,054

(22) Filed: Oct. 14, 2003

(65) Prior Publication Data

US 2005/0080995 A1   Apr. 14, 2005

(51) Int. Cl.
*G06F 12/08* (2006.01)
(52) U.S. Cl. ..................................... 711/133
(58) Field of Classification Search ............... 711/133, 711/145

See application file for complete search history.

(56) References Cited

U.S. PATENT DOCUMENTS

| | | | |
|---|---|---|---|
| 3,699,533 A | 10/1972 | Hunter | |
| 5,287,487 A | 2/1994 | Priem et al. | |
| 5,341,465 A | 8/1994 | Goto | |
| 5,568,632 A | 10/1996 | Nelson | |
| 5,758,151 A | 5/1998 | Milligan et al. | |
| 5,983,310 A | 11/1999 | Adams | 711/6 |
| 5,983,313 A | 11/1999 | Heisler et al. | 711/105 |
| 6,148,372 A * | 11/2000 | Mehrotra et al. | 711/122 |
| 6,178,120 B1 | 1/2001 | Lee | 365/189.05 |
| 6,279,076 B1 | 8/2001 | Shishido et al. | 711/113 |
| 6,470,424 B1 | 10/2002 | Adams | 711/133 |
| 2001/0010069 A1 * | 7/2001 | Hetherington et al. | 711/122 |
| 2005/0055528 A1 * | 3/2005 | Arimilli et al. | 711/203 |

* cited by examiner

*Primary Examiner*—Hiep T. Nguyen
(74) *Attorney, Agent, or Firm*—Robert A. Voigt, Jr.; Winstead Sechrest & Minick P.C.

(57) ABSTRACT

A method and system for improving the performance of a cache. The cache may include a tag entry that identifies the previously requested address by the processor whose data was not located in the cache. If the processor requests that address a second time, then there is a significant probability that the address will be accessed again. When the processor requests the address identified by the tag entry a second time, the cache is updated by inserting the data located at that address and evicting the data located in the least recently used entry. In this manner, data will not be evicted from the cache unless there is a significant probability that the data placed in the cache will likely be accessed again. Hence, data may not be evicted in the cache by the processor and replaced with data that will not be reused, such as in an interrupt routine.

20 Claims, 8 Drawing Sheets

PERFORMANCE OF A CACHE BY INCLUDING A TAG THAT STORES AN INDICATION OF A PREVIOUSLY REQUESTED ADDRESS BY THE PROCESSOR NOT STORED IN THE CACHE

TECHNICAL FIELD

The present invention relates to the field of a data processing system, and more particularly to a cache that includes a tag that stores an indication of the previously requested address by the processor not stored in the cache.

BACKGROUND INFORMATION

A conventional data processing system may comprise a processor coupled to a system memory where the processor may comprise one or more levels of cache memory. A cache memory may refer to a relatively small, high-speed memory that contains a copy of information from one or more portions of the system memory. Frequently, the cache memory is physically distinct from the system memory. Such a cache memory may be integral with a processor in the system, commonly referred to as a Level-1 (L1) or primary cache, or may be non-integral with a processor in the system, commonly referred to as a Level-2 (L2) or secondary cache.

When a processor generates a request of an address of data (a read request) and the requested data resides in its cache memory, e.g., L1 cache, then a "cache hit" is said to take place. The processor may then obtain the data from the cache memory without having to access the system memory. If the data is not in the cache memory, then a "cache miss" is said to occur. The memory request may be forwarded to the system memory and the data may subsequently be retrieved from the system memory as would normally be done if the cache did not exist. On a cache miss, the data that is retrieved from the system memory may be provided to the processor and may also be written into the cache memory due to the statistical likelihood that this data will be requested again by that processor. Likewise, if a processor generates a write request, the write data may be written to the cache memory without having to access the system memory over the system bus.

As is known to those skill in the art, a wide variety of cache configurations or organizations are commonly available. For example, a "direct-mapped" cache is organized such that for each addressed location in main memory, there exists one and only one location in a cache data array that could include a copy of such data. In a "n-way set-associative" cache, the cache is configured such that for any one addressed location in main memory, there exists n possible locations within the cache data array that might include a copy of such data.

There have been many methods in designing caches that seek to increase the cache hit rate thereby improving performance of the cache. A "cache hit rate" may refer to the rate at which cache hits occur relative to the total number of accesses that are made to the cache. By improving the cache hit rate, the performance of the system may be improved, i.e., less data needs to be serviced from system memory.

In an "n-way set-associative" cache, one way to improve the performance of the cache is to use a Least Recently Used (LRU) replacement method to assist in determining how data is to be managed in the cache. The LRU replacement method uses a single logical stack construct composed of "n" elements for each of the congruence classes in an n-way set-association cache where each cache entry stores particular data. A congruence class may refer to entries in a way whose addresses are a modulo of one another. As stated above, if an item, e.g., data, requested by the processor is present in the cache, a "cache hit" is said to occur. When a cache hit occurs, the cache entry comprising the information, e.g., data, requested is considered to become the "most recently used" item in its congruence class and is logically moved from its current location in the stack to the top of the stack. The entry in the congruence class that can logically be viewed as being at the bottom of the stack is the "least recently used" item in the congruence class. As stated above, if an item, e.g., data, requested by the processor is not present in the cache, a "cache miss" is said to occur. When a cache miss occurs, the requested item is retrieved from system memory and then stored in the top stack position. When a new entry is inserted in the stack, the cache entry in the bottom stack position of the stack is evicted. The information, e.g., data, at that entry may subsequently be discarded. When there is a cache hit to an entry in the middle of the stack, that entry is moved to the top of the stack. Those entries that are located above the entry requested are each shifted down one position to fill the void left by the entry that moved to the top of the stack.

However, the processor may execute a series of instructions that may only be executed once, such as an interrupt routine. Since these instructions will not be in the cache memory, cache misses will occur. As stated above, in the LRU algorithm, when a cache miss occurs, the requested item is retrieved from system memory and then stored in the top stack position. When a new entry is logically placed at the top of the stack for its congruence class, the cache entry that is logically located at the bottom stack position is evicted. The information, e.g., data, at that entry may subsequently be discarded. When the interrupt routine is completed, the instruction sequence may return to the point of execution prior to the interruption. However, the cache at the point of returning to the prior instruction sequence may contain information that will not be reused (instructions from interrupt routine) and the information that might otherwise have been requested (instructions discarded when the instructions from the interrupt routine were inserted in the stack) has been evicted. Consequently, the cache hit rate may be diminished.

A possible solution to not evicting data that may be requested by the processor once the processor completes a series of instructions that will not reused, e.g., an interrupt routine, is to "pin" the data in the cache. Pinning the data may refer to designating particular data in the cache to not be discarded. That is, pinning the data may refer to designating particular data in the cache to not participate in the LRU algorithm. However, this makes the cache non-transparent to the programmer. That is, the programmer is forced to manage the cache by designating which particular data is to be pinned and which such data is to be unpinned, i.e., when such data is to be available for the LRU algorithm. An alternative approach to pinning data is to define instructions or data that will not be reused as non-cacheable thereby preventing such instructions or data from being stored in the cache. However, this also makes the cache non-transparent to the programmer. That is, the programmer is forced to manage the cache by designating which particular instruction or datum is to be prevented from entering the cache.

Therefore, there is a need in the art for a cache design that does not evict data that may be requested by the processor once the processor completes a series of instructions that will not reused, e.g., an interrupt routine, that is transparent to the programmer.

SUMMARY

The problems outlined above may at least in part be solved in some embodiments by including a tag entry in the cache that identifies the previously requested address by the processor whose data was not located in the cache. If the processor requests that address a second time, then there is a significant probability that the address will be accessed again. When the processor requests the address identified by the tag entry a second time, the cache is updated by inserting the data located at that address and evicting the data located in the least recently used entry.

In one embodiment of the present invention, a method for improving cache performance may comprise the step of receiving a request of an address of data. The method may further comprise determining if the requested data is located in the cache. The method may further comprise determining if the requested address is associated with the contents of a tag if the requested data is not located in the cache. The method may further comprise replacing a data element in the cache using the contents of the tag if the requested address is associated with the contents of the tag and if a bit associated with the tag is in a first state. The bit associated with the tag is in a first state if the contents of the tag were previously requested and not located in the cache.

The foregoing has outlined rather generally the features and technical advantages of one or more embodiments of the present invention in order that the detailed description of the invention that follows may be better understood. Additional features and advantages of the invention will be described hereinafter which may form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method and system for improving the performance of a cache. In one embodiment of the present invention, a cache may include a tag entry that identifies the previously requested address by the processor whose data was not located in the cache. If the processor requests that address a second time, then there is a significant probability that the address will be accessed again. When the processor requests the address identified by the tag entry a second time, the cache is updated by inserting the data located at that address and evicting the data located in the least recently used entry. In this manner, data will not be evicted from the cache unless there is a significant probability that the data placed in the cache will likely be accessed again. Hence, data may not be evicted in the cache by the processor and replaced with data that will not be reused, such as in an interrupt routine.

Although the present invention is described with reference to an instruction cache, it is noted that the principles of the present invention may be applied to data caches or a unified instruction/data cache. It is further noted that embodiments applying the principles of the present invention to data caches or a unified instruction/data cache would fall within the scope of the present invention.

Additionally, while certain actions may result depending on whether a value is a logical value of "1" or "0", alternative embodiments in accordance with the present inventive principles may be implemented in the context of the same action resulting from the opposite value, e.g., value of "0" instead of the logical value of "1," and such embodiments would also fall within the spirit and scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

FIG. 1—System

Figure 1:
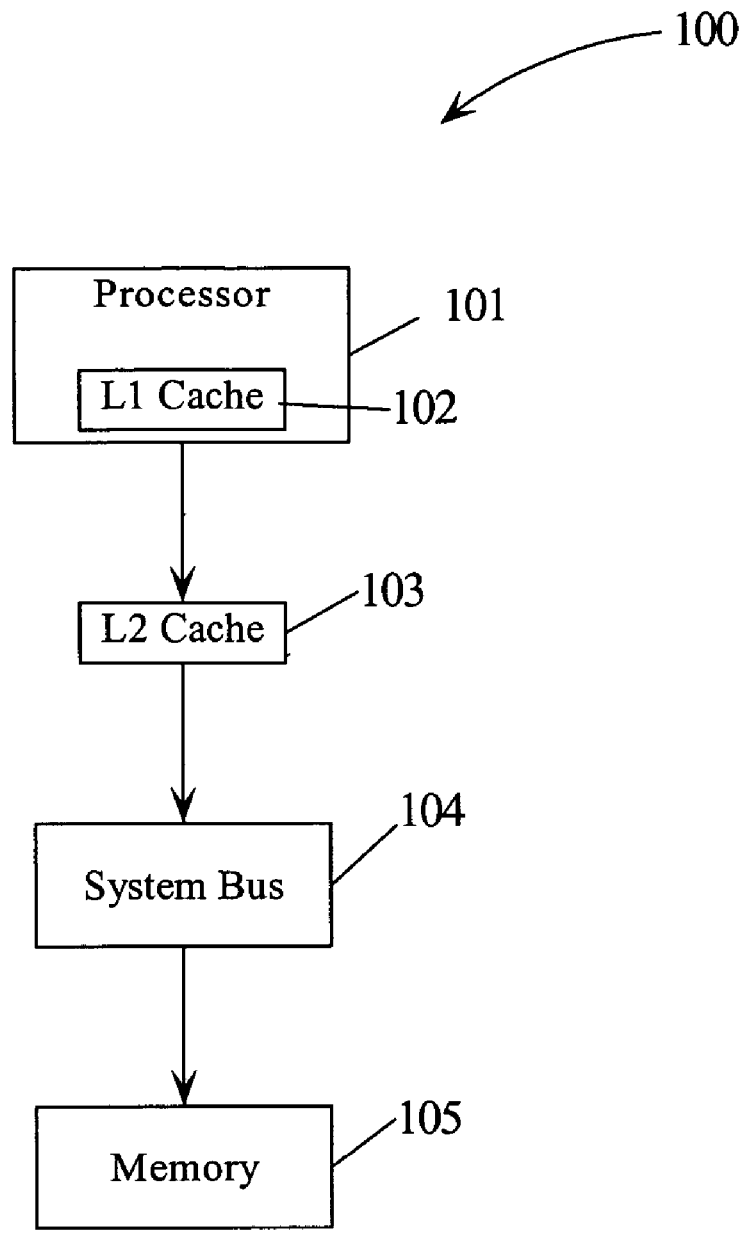
FIG. 1 illustrates a system in accordance with an embodiment of the present invention.

FIG. 1 illustrates an embodiment of the present invention of a system 100. System 100 may comprise one or more processors 101. Processor 101 may comprise a level one (L1) cache 102, e.g., L1 instruction cache. L1 cache 102 may be configured to store instructions that may be repeatedly accessed by processor 101. In order to minimize data access latency, one or more additional levels of cache memory coupled to processor 101 may be implemented such as a level two (L2) cache 103 coupled to processor 101. The lower cache levels, e.g., L2 cache 103, may be employed to stage data to an L1 cache, e.g., L1 cache 102, and typically have progressively larger storage capacities but longer access latencies. Referring to FIG. 1, processor 101 may be coupled to system memory 105 via system bus 104. Bus 104 may subsequently permit the transfer of information, e.g., addresses, data, between processor 101 and system memory 105. It is noted that one of ordinary skill in the art will readily recognize that system 100 may include other and/or additional devices that, for clarity, are not depicted. It is further noted that system 100 may be any type of system and that FIG. 1 is not to be limited in scope to any one particular embodiment. For example, system 100 may include a single cache memory that may or may not be integrated with processor 101.

As stated in the Background Information section, a possible solution to not evict data in a cache that may be requested by the processor once the processor completes a series of instructions that will not reused, e.g., an interrupt routine, is to "pin" the data in the cache. Pinning the data may refer to designating particular data in the cache to not be discarded. That is, pinning the data may refer to designating particular data in the cache to not participate in the LRU algorithm. However, this makes the cache non-transparent to the programmer. That is, the programmer is forced to manage the cache by designating which particular data is to be pinned and which such data is to be unpinned, i.e., when such data is to be available for the LRU algorithm. An alternative approach to pinning data is to define instructions or data that will not be reused as non-cacheable thereby preventing such instructions or data from being stored in the cache. However, this also makes the cache non-transparent to the programmer. That is, the programmer is forced to manage the cache by designating which particular instruction or datum is to be prevented from entering the cache. Therefore, there is a need in the art for a cache design that does not evict data that may be requested by the processor once the processor completes a series of instructions that will not be reused, e.g., an interrupt routine, that is transparent to the programmer.

Figure 2:
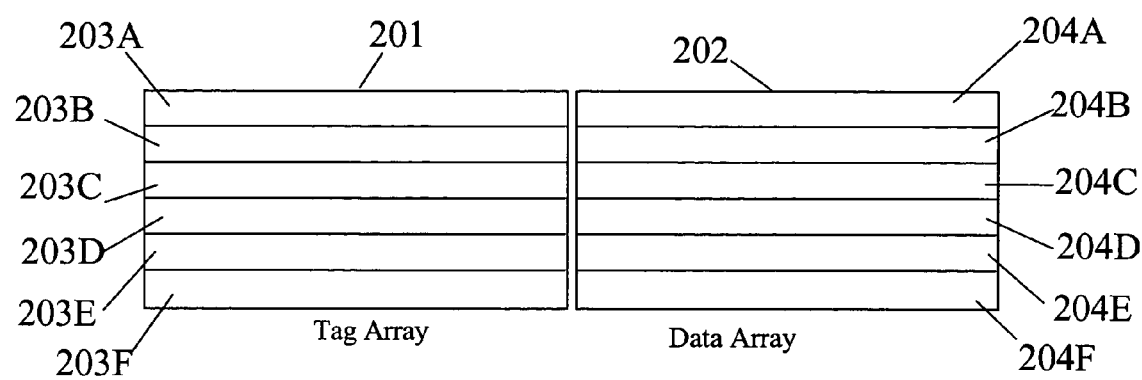
FIG. 2 illustrates an embodiment of the present invention of a direct-mapped cache.
Figure 3:
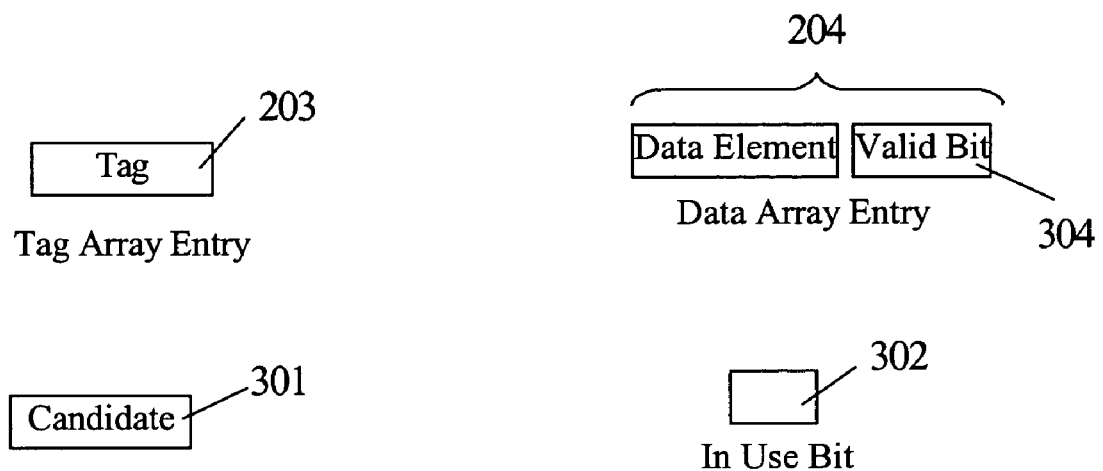
FIG. 3 illustrates an embodiment of the present invention of an entry in the tag and data array, an in-use bit associated with each tag and data array entry, and a candidate tag.
Figure 4:
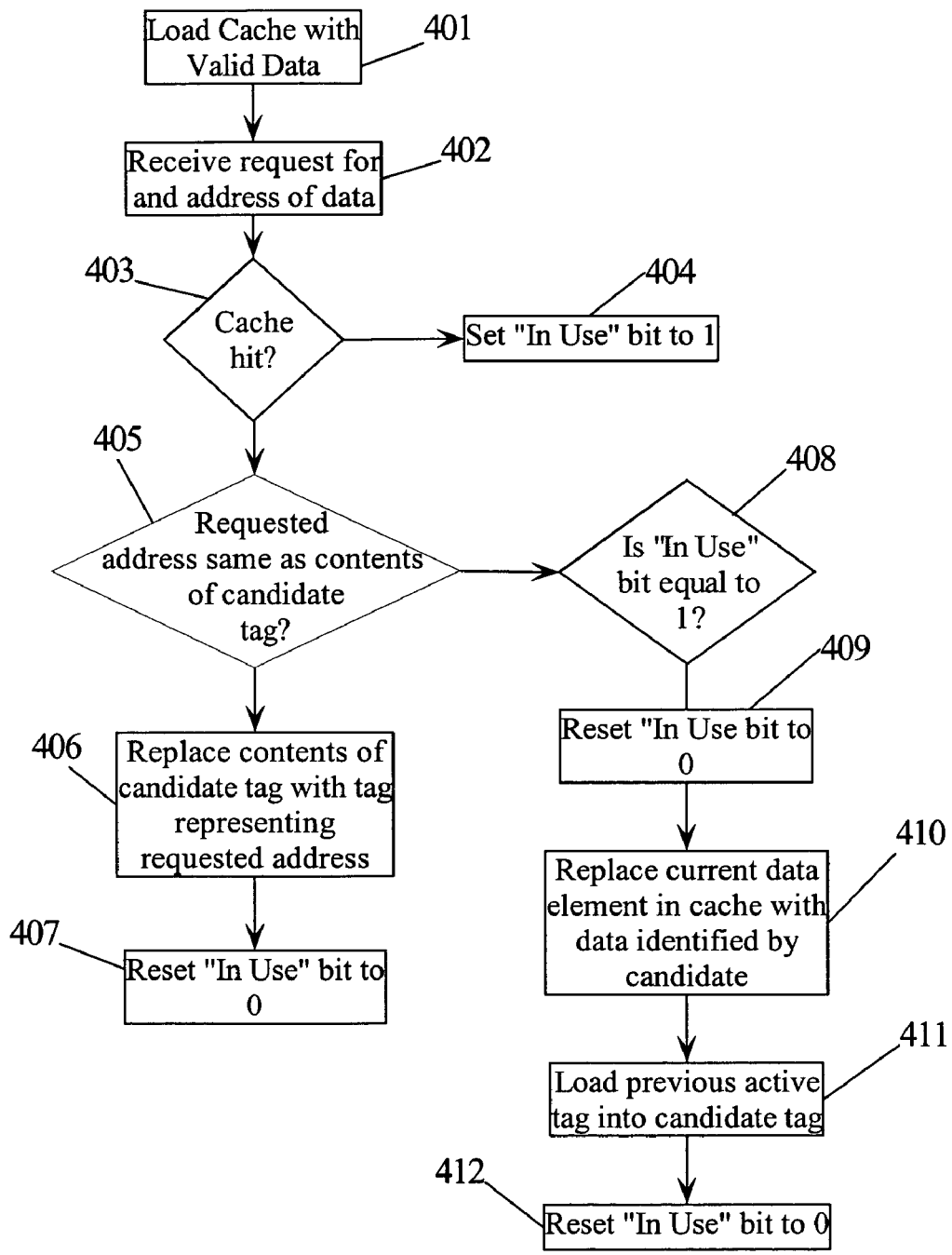
FIG. 4 is a flowchart of a method for improving the performance of a direct-mapped cache by not evicting data in the direct-mapped cache that would have been replaced with data not to be reused in accordance with an embodiment of the present invention.
Figure 5:
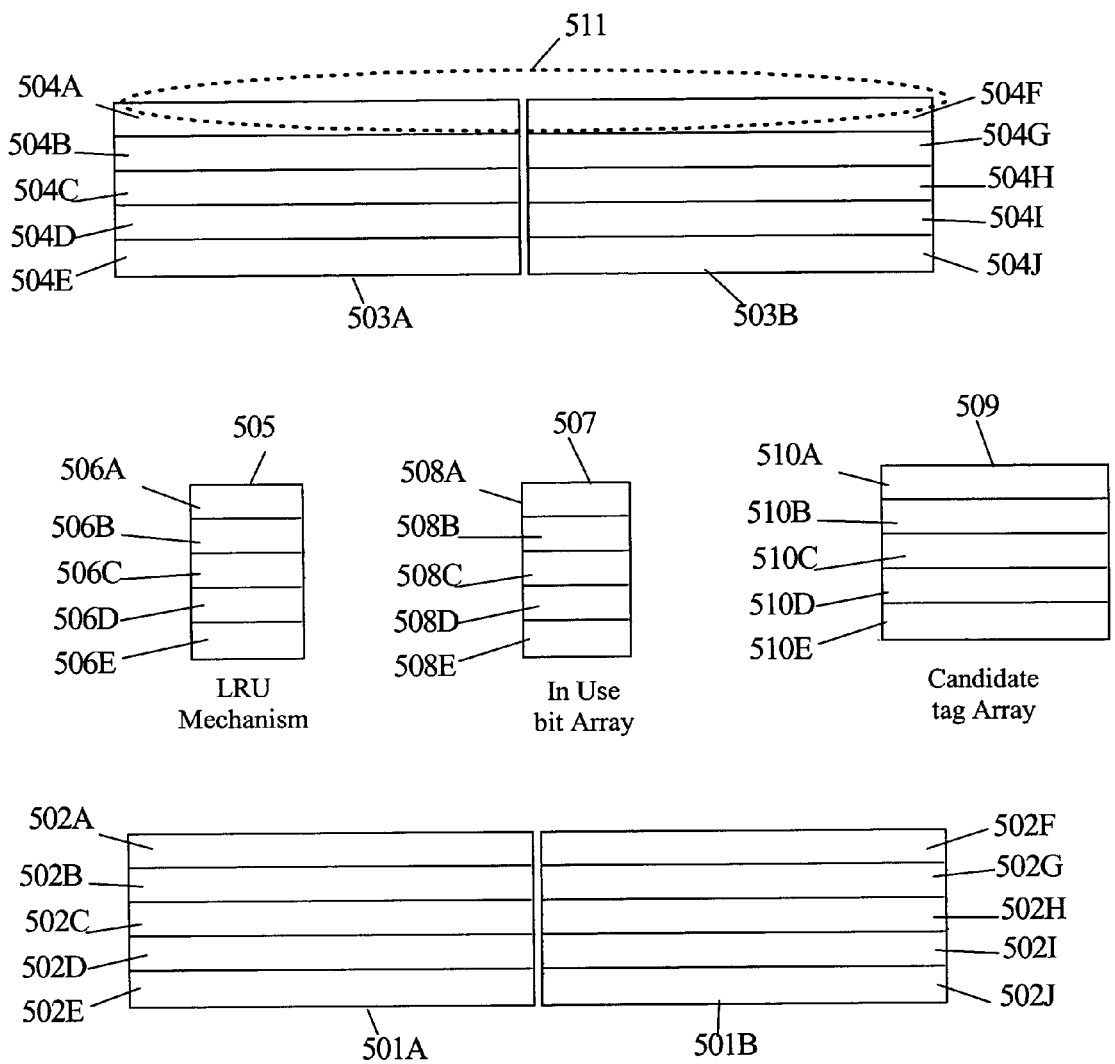
FIG. 5 illustrates an embodiment of the present invention of an n-way set-associative cache.
Figure 6:
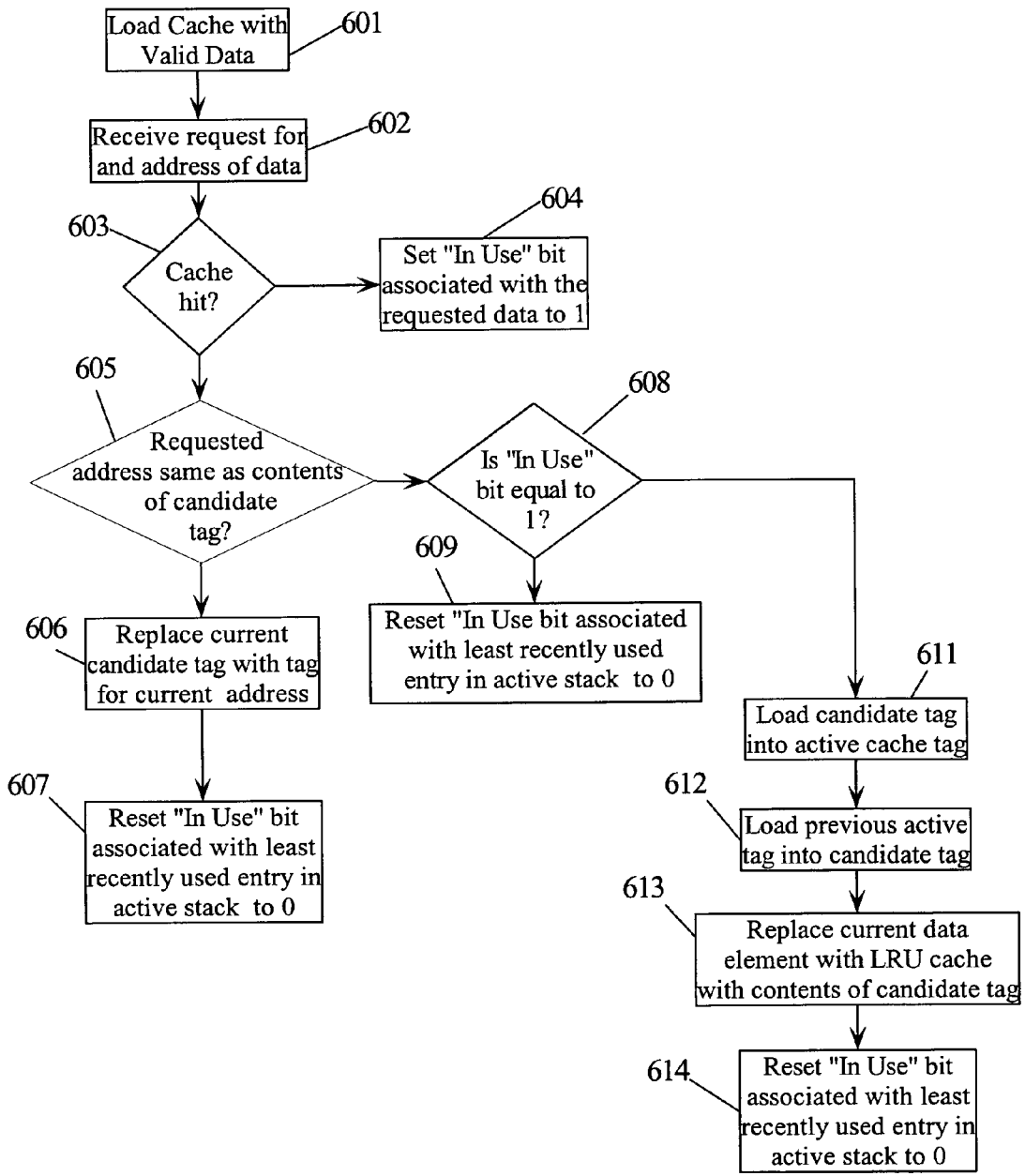
FIG. 6 is a flowchart of a method for improving the performance of an n-way set-associative cache by not evicting data in the n-way set-associative cache that would have been replaced with data not to be reused in accordance with an embodiment of the present invention.
Figure 7:
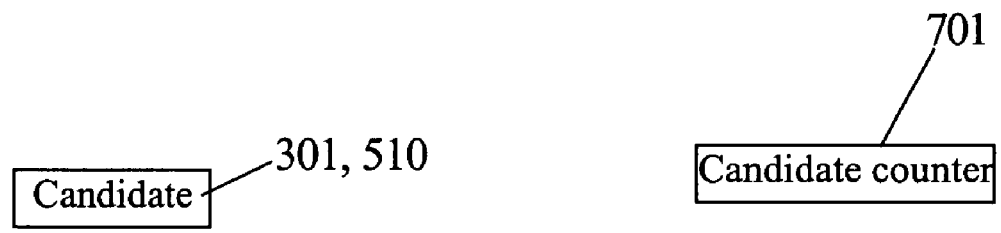
FIG. 7 illustrates an embodiment of the present invention of a candidate counter associated with each candidate.
Figure 8:
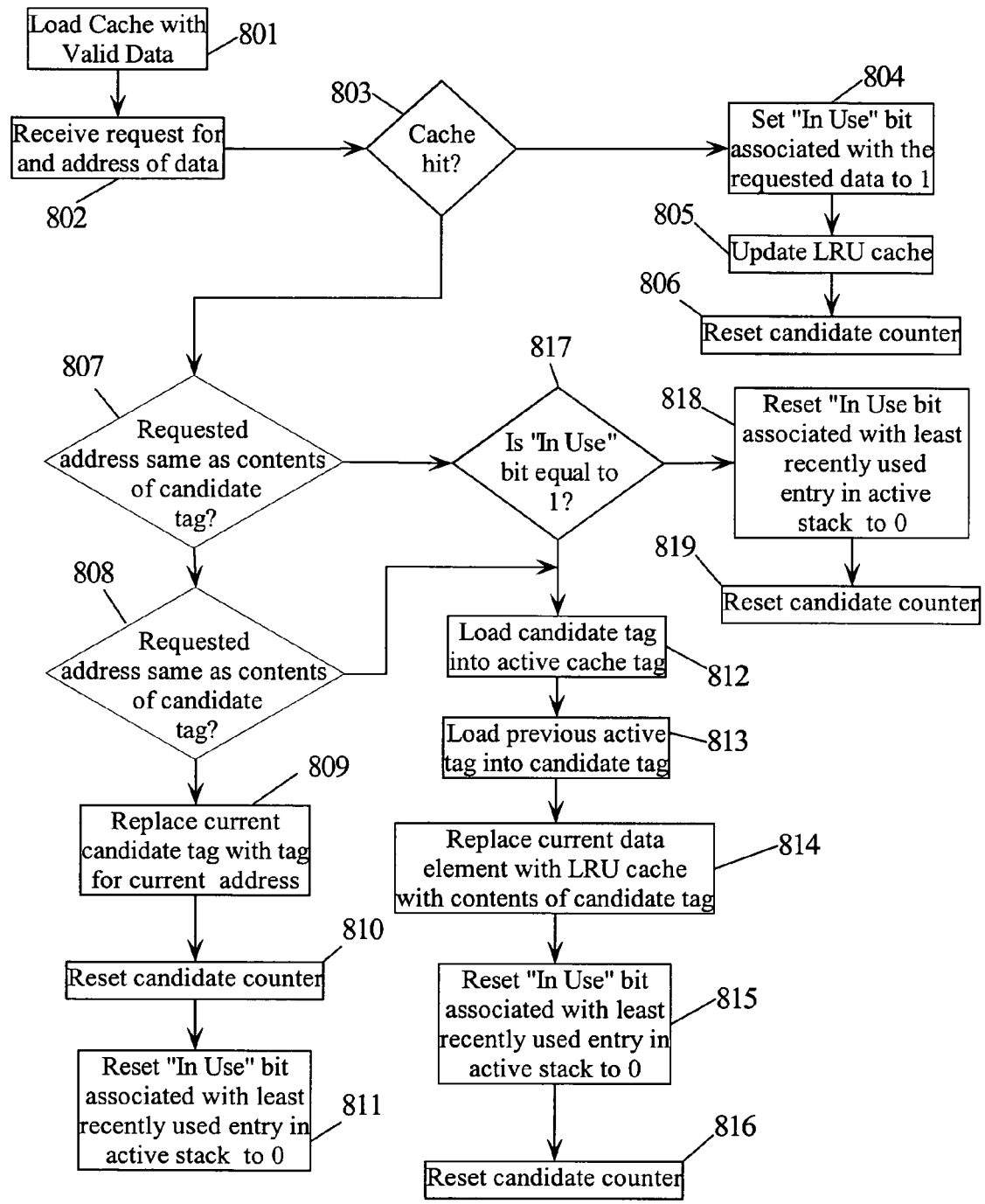
FIG. 8 is a flowchart of a method for improving the performance of an n-way set-associative cache by not evicting data in the n-way set-associative cache that would have been replaced with data not to be reused as well as detecting cache thrashing in accordance with an embodiment of the present invention.

A direct-mapped cache design that does not evict data that may be requested by the processor once the processor completes a series of instructions that will not reused, e.g., an interrupt routine, that is transparent to the programmer is described below in conjunction with FIGS. 2–4. FIG. 2 illustrates an embodiment of the present invention of a direct-mapped cache. FIG. 3 illustrates an embodiment of the present invention of an entry in the tag and data array of the cache, the "in-use bit" associated with each tag and data array entry, and a "candidate tag." FIG. 4 is a flowchart of a method for not evicting data that may be requested by the processor once the processor completes a series of instructions that will not be reused, e.g., an interrupt routine, without pinning the data in a direct-mapped cache. FIG. 5 illustrates an embodiment of the present invention of an n-way set-associative cache. FIG. 6 is a flowchart of a method for not evicting data that may be requested by the processor once the processor completes a series of instructions that will not be reused, e.g., an interrupt routine, without pinning the data in an n-way set-associative cache. FIG. 7 illustrates an embodiment of the present invention of a "candidate counter" associated with each candidate. FIG. 8 is a flowchart of a method that improves the performance of the cache using the method disclosed in FIG. 6 as well as detects cache threshing by a candidate counter.

FIG. 2—Direct-Mapped Cache

FIG. 2 illustrates an embodiment of the present invention of a direct-mapped cache 200 that may represent either L1 cache 102 or L2 cache 103 or any other cache located in a computer system, e.g., disk cache.

Referring to FIG. 2, direct-mapped cache 200 may comprise a tag array 201 and a data array 202. Tag array 201 may include a plurality of entries 203A–F and data array 202 may include a plurality of entries 204A–F. Entries 203A–F may collectively or individually be referred to as entries 203 or entry 203, respectively. Entries 204A–F may collectively or individually be referred to as entries 204 or entry 204, respectively. Each entry 204 in data array 202 may store data, e.g., instruction. Each entry 203 in tag array 201 may store a "tag" (a series of bits) used to identify a particular memory location in system memory 105 (FIG. 1) that stores the same data stored in an associated entry 204 in data array 202. For example, tag entry 203A may store a tag that identifies a particular memory location in system memory 105 that stores that same data stored in entry 204A in data entry 202. It is noted that tag array 201 and data array 202 may comprise any number of entries 203 and 204, respectively, and that FIG. 2 is illustrative.

Referring to FIG. 2, each tag array entry 203 in cache 200 may be associated with a tag, referred to herein as a "candidate tag," as discussed below in association with FIG. 3. Further, each tag array entry 203 may be associated with a bit, referred to herein as a "in-use bit," as discussed below in association with FIG. 3. Further, the candidate tag may be associated with an in-use bit as discussed below in association with FIG. 3.

FIG. 3—Candidate and In-use Bit

FIG. 3 illustrates an embodiment of the present invention of an entry in the tag and data array 201, 202, respectively, of cache 200 (FIG. 2), an "in-use bit" 302 associated with a candidate tag 301 as well as each tag array entry 203.

Referring to FIG. 3, as stated above, tag array entry 203 may include a tag used to identify a particular memory location in system memory 105 (FIG. 1) that stores the same data stored in an associated entry 204 in data array 202. In one embodiment, a portion of data array entry 204 may include a valid bit 304 and a data element 303. In one embodiment, data element 303 may include one or more instructions if direct-mapped cache 200 is an instruction cache. In an alternative embodiment, valid bit 304 may be part of tag array entry 203. Valid bit 304 may refer to an indication as to whether data element 303 is valid data.

As stated above, each tag array entry 203 may be associated with a particular in-use bit 302. Further, as stated above, cache 200 may comprise a candidate tag 301 that may be associated with a particular in-use bit 302. In one embodiment, multiple candidate tags 301 may be included in cache 200 thereby providing the multiple candidate tags 301 an opportunity to wait simultaneously for a second access with the first candidate tag 301 with two accesses replacing the active cache line, as discussed further below. Candidate tag 301 may refer to a tag (a series of bits) that identifies a unique address in system memory 105 (FIG. 1) that was the last address recently requested by processor 101 (FIG. 1). In-use bit 302 associated with tag array entries 203 may refer to a bit that indicates whether the tag stored in tag entry 203 has been accessed since the last time the address identified by candidate tag 301 was requested by processor 101. That is, in-use bit 302 may refer to a bit that indicates whether the address identified by the tag stored in tag entry 203 has been accessed since the last time the address identified by candidate tag 301 was requested by processor 101. In one embodiment, in-use bit 302 associated with tag entry 203 may store a logical value of "1" if the address identified by the tag stored in tag entry 203 was accessed since the last time the address identified by candidate tag 301 was requested by processor 101. In-use bit 302 associated with tag entry 203 may store a value of "0" if the address identified by the tag stored in tag entry 203 was not accessed since the last time the address identified by candidate tag 301 was requested by processor 101. In-use bit 302 associated with candidate tag 301 may similarly be constructed except that in-use 302 associated with candidate tag 301 may refer to a bit that indicates whether the address identified by the tag stored in candidate tag 301 has been accessed since the last time the address identified by candidate tag 301 was requested by processor 101.

As will be explained in greater detail below, candidate tag 301 and in-use bit 302 may be used conjunctively to determine when processor 101 requests an address not stored in cache 200 a second time. If processor 101 requests an address not stored in cache 200 a second time, then there is a significant probability that the address will be accessed again and therefore the data associated with that address should be placed in cache 200 (FIG. 2). As stated above, candidate tag 301 may be used to store a tag identifying an address requested by processor 101 whose data is not located in cache 200. Upon the first miss, in-use bit 302 may equal the value of "0." If processor 101 requests a second time the address identified by the tag stored in candidate tag 301 and in-use bit 302 equals the value of "0," then processor 101 may evict data stored in data array 202 (FIG. 2) and insert the data identified by candidate tag 301 in data array 202. In this manner, data will not be evicted from cache 200 unless there is a significant probability that the data placed in cache 200 will likely be accessed again. Hence, data may not be evicted by processor 101 by data that will not be reused such as in an interrupt routine. A method for improving performance in a direct-mapped cache 200 using candidate tag 301 and in-use bit 302 is described below in conjunction with FIG. 4.

FIG. 4—Method for Improving the Performance of a Direct-Mapped Cache

FIG. 4 is a flowchart of one embodiment of the present invention for a method 400 for improving the performance of direct-mapped cache 200 by not evicting data in direct-mapped cache 200 that would have been replaced with data not to be reused, such as data from an interrupt routine.

Referring to FIG. 4, in conjunction with FIGS. 1–3, in step 401, direct-mapped cache 200 is loaded with valid data. That is, upon initialization, data array 202 in cache 200 may be loaded with valid data as the initial requests are cache misses thereby causing data to be retrieved from memory 105 and loaded into cache 200. In one embodiment, each in-use bit 302 associated with each entry 204 in data array 202 may be pre-set with a logical value of "1," upon loading cache 200 with valid data.

In step 402, cache 200 receives a request of an address of data from processor 101 and maps that address to a particular tag of cache 200. In step 403, cache 200 determines if the data of the address requested is located in cache 200. That is, in step 403, cache 200 determines if there is a cache hit.

If there is a cache hit, then, in step 404, cache 200 sets in-use bit 302, associated with the tag entry 203 that contains the tag that identifies the address requested by processor 101 to a logical value of "1."

If, however, the data requested by processor 101 is not located in cache 200 (a cache miss), then, in step 405, cache 200 makes a determination if the requested address is the same as the contents of candidate tag 301. That is, cache 200 makes a determination if the address requested by processor 101 is identified by the tag stored in candidate tag 301.

If the requested address is not the same as the contents of candidate tag 301, then, in step 406, the contents of candidate tag 301 is replaced with the tag that identifies the address requested by processor 101. In this manner, candidate tag 301 stores the tag contents that identifies the last address requested by processor 101 whose data is not stored in cache 200. In step 407, cache 200 resets in-use bit 302, associated with candidate tag 301, to a value of "0."

If the requested address is the same as the contents of candidate tag 301, then, in step 408, cache 200 determines if the in-use bit 302 associated with candidate tag 301 is equal to the logical value of "1." If in-use bit 302 associated with candidate tag 301 is equal to the logical value of "1," then, in step 409, cache 200 resets in-use bit 302, associated with candidate tag 301, to a value of "0." As stated above, when in-use bit 302 contains a logical value of "1," then a cache hit has occurred since the last time the line associated with candidate tag 301 has been accessed. Since a cache hit has occurred since the last time the line associated with candidate tag 301 has been accessed, cache 200 may reset in-use bit 302 to the value of "0" to determine if processor 101 will request the address identified by the tag stored in candidate tag 301 a second time.

If, however, in-use bit 302 associated with candidate tag 301 is equal to the value of "0," then, in step 410 the current data element in cache 200 is replaced with the data associated with the address identified by the contents of candidate tag 301. Since a direct-mapped cache 200 has a single entry in each of its congruence classes, the data that is currently and uniquely indexed is replaced by the data identified the tag stored in candidate tag entry 301 which is associated with this congruency class. When in-use bit 302 has a value of "0" and the address requested by processor 101 is the same address identified in candidate tag 301, then processor 101 has requested this particular cache line a second time whose data was not stored in cache 200. When processor 101 requests a cache line for a second time whose data is not stored in cache 200, then processor 101 may evict data stored in data array 202 (FIG. 2) and insert the data identified by candidate tag 301 in data array 202. In this manner, data will not be evicted from cache 200 unless there is a significant probability that the data placed in cache 200 will likely be accessed again. Hence, data may not be evicted by processor 101 by data that will not be reused such as in an interrupt routine.

In step 411, the tag in the entry 203 associated with the current data element 204, whose data was replaced in step 410, is stored in candidate tag 301.

In step 412, cache 200 resets in-use bit 302, associated with candidate tag 301, to a value of "0."

It is noted that method 400 may include other and/or additional steps that, for clarity, are not depicted. It is further noted that method 400 may be executed in a different order presented and that the order presented in the discussion of FIG. 4 is illustrative. It is further noted that certain steps in method 400 may be executed in a substantially simultaneous manner.

A method for improving the performance of an n-way set-associative cache (illustrated in FIG. 5) by not evicting data in the n-way set-associative cache would have been replaced with data not to be reused, such as data from an interrupt routine, is described further below in conjunction with FIG. 6.

FIG. 5—N-Way Set-Associative Cache

FIG. 5 illustrates an embodiment of the present invention of an n-way set-associative cache 500 that may represent either L1 cache 102 or L2 cache 103 or any other cache located in a computer system, e.g., disk cache, that may use the LRU algorithm.

Referring to FIG. 5, n-way set-associative cache 500 may comprise n data arrays or "ways" 501A–B. Data array 501A may comprise entries 502A–E and data array 501B may comprise entries 502F–J. Data arrays 501A–B may collectively or individually be referred to as data arrays 501 or data array 501, respectively. Entries 502A–J may collectively or individually be referred to as entries 502 or entry 502, respectively. N-way set-associative cache 500 may further comprise n tag arrays 503A–B. Tag arrays 503A–B may collectively or individually be referred to as tag arrays 503 or tag array 503, respectively. Tag array 503A may comprise entries 504A–E and tag array 503B may comprise entries 504F–J. Entries 504A–J may collectively or individually be referred to as entries 504 or entry 504, respectively. N-way set-associative cache 500 may further comprise an LRU mechanism 505 with entries 506A–E. Entries 506A–E may collectively or individually be referred to as entries 506 or entry 506, respectively. N-way set-associative cache 500 may further comprise an in-use bit array 507 with entries 508A–E. Entries 508A–E may collectively or individually be referred to as entries 508 or entry 508, respectively. N-way set-associative cache 500 may further comprise a candidate tag array 509 with entries 510A–E. Entries 510A–E may collectively or individually be referred to as entries 510 or entry 510, respectively. It is noted that FIG. 5 is illustrative of an n-way set-associative cache. It is further noted that data array 501, tag array 502, LRU mechanism 505, in-use bit array 507 and candidate tag array 509 may each comprise the same number of entries which may be a different number than illustrated.

Referring to FIG. 5, tag array 503 may be similarly configured as tag array 201 (FIG. 2) except that tag array 503 comprises n arrays corresponding to n data arrays 501. Each entry 504 in tag arrays 503 may identify a particular data element (copy of the data associated with the address identified by that tag stored in entry 504) in data arrays 503. For example, entry 504A of tag array 503A may comprise a tag used to identify the data element stored in entry 502A of data array 501A. Similarly, entry 504F of tag array 503B may comprise a tag used to identify the data element stored in entry 502F of data array 501B.

A "set" may refer to a particular row of entries across tag arrays 503. For example, set 511 may include the row of entries 504A and 504F. Each set may also be classified as a "stack" or a "congruence class" implementing the LRU algorithm. For example, set 511 may include a stack with elements stored in entries 504A and 504F. LRU mechanism 505 may indicate which element in a stack is the least recently used item. For example, the data in entry 506A may indicate whether the tag stored in entry 504A or in entry 504F of stack 511 is the least recently used tag. When an entry in a stack is accessed, the corresponding entry 506 in the same congruence class in LRU mechanism 505 is updated to point to the entry 504 not accessed.

When processor 101 (FIG. 1) requests an address, it is mapped to a particular congruence class. For example, if processor 101 requests an address mapped to a congruence class composed of tag array entries 504A and 504B, then these two tags will be compared against the address to determine if either is a match, i.e., if there is a cache hit. If, for example, there was a match between the requested address and the tag in entry 504A, then the data from entry 502A would be retrieved.

Referring to FIG. 5, each stack or set may be associated with an entry 508 in in-use bit array 507. Hence, each entry 502 in data array 501 may be associated with an entry 508 in in-use bit array 507. Each entry 508 in in-use bit array 507 is similarly configured as in-use bit 302 (FIG. 3) as described above. Similarly, each stack or set may be associated with an entry 510 in candidate tag array 509. Hence, each entry 502 in data array 501 may be associated with an entry 510 in candidate tag array 509. Each entry 510 in candidate tag array 509 is similarly configured as candidate tag 301 (FIG. 3) as described above. A method for improving the performance of n-way set associative cache 500 using the principles of the present invention is described below in conjunction with FIG. 6.

FIG. 6—Method for Improving the Performance of an N-Way Set-Associative Cache

FIG. 6 is a flowchart of one embodiment of the present invention for a method 600 for improving the performance of n-way set-associative cache 500 (FIG. 5) by not evicting data in n-way set associative cache 500 that would have been replaced with data not to be reused, such as data from an interrupt routine.

Referring to FIG. 6, in conjunction with FIGS. 1–3 and 5, in step 601, n-way set-associative cache 500 is loaded with valid data. That is, each entry 502 in each data array 501 is loaded with valid data. In one embodiment, each in-use bit 508 associated with each entry 502 in each data array 501 may be pre-set with a logical value of "1," upon loading cache 500 with valid data.

In step 602, cache 500 receives a request of an address of data from processor 101. In step 603, cache 500 determines if the data of the address requested is located in cache 500. That is, in step 603, cache 500 determines if there is a cache hit.

If there is a cache hit, then, in step 604, cache 500 sets in-use bit 508, associated with entry 502 containing the data of the address requested by processor 101, to a logical value of "1." In step 605, the stack or row, which represents the congruence class of the stack or row containing the data address requested by processor 101, is updated. In one embodiment, the LRU element associated with the stack or row (congruence class) for the data requested by processor 101 is updated to reflect which of the element of the congruence class has been least recently used. For example, referring to FIG. 5, if processor 101 requested data stored in entry 502F, then the LRU for that congruence class would be updated to indicate that the data contained in entry 502A contained the least recently used element.

If, however, the data requested by processor 101 is not located in cache 500 (a cache miss), then, in step 606, cache 500 makes a determination if the requested address is the same as the contents of candidate tag 510 for the active stack or row. That is, cache 500 makes a determination if the address requested by processor 101 is identified by the tag stored in candidate tag 510 associated with the active stack.

If the requested address is not the same as the contents of candidate tag 510 associated with the active stack, then, in step 607, the contents of candidate tag 510 associated with the active stack is replaced with the tag that identifies the address requested by processor 101. In this manner, candidate tag 510 associated with the active stack stores the tag that identifies the last address requested by processor 101 whose data is not stored in cache 500. In step 608, cache 500 resets in-use bit 508, associated with the least recently used entry 502 in the active stack (located at the bottom of the active stack), to a value of "0." Only in-use bit 508, associated with the least recently used entry 502, is reset to the value of "0" as it is assumed that the data located in the entries 502, e.g., entry 502A, above the least recently used entry 502, e.g., entry 502F, in the active stack was accessed prior to the data located in the least recently used entry 502.

If the requested address is the same as the contents of candidate tag 510 associated with the active stack, then, in step 609, cache 500 determines if the in-use bit 508 associated with the least recently used entry 502 in the active stack is equal to the logical value of "1." If in-use bit 508 is equal to the logical value of "1," then, in step 610, cache 500 resets in-use bit 508, associated with the least recently used entry 502 in the active stack (located at the bottom of the active stack), to a value of "0." As stated above, when in-use bit 508 contains a logical value of "1," then a cache hit in this congruence class has occurred since the last time candidate tag 510 associated with this congruence class has been checked. Since a cache hit has occurred since the last time candidate tag 510 has been checked, cache 500 may reset in-use bit 508 to the value of "0" to determine if processor 101 will request the address identified by the tag stored in candidate tag 510 a second time.

If, however, in-use bit 508 associated with the least recently used entry 502 in the active stack is equal to the logical value of "0," then, in step 611, cache 500 loads the tag stored in candidate tag 510 associated with the active stack into entry 504 associated with the active stack.

In step 612, cache 500 loads the previous active tag (tag stored in entry 504 associated with the active stack) into candidate tag 510 associated with the active stack.

In step 613, the current data element in cache 500 is replaced with the data associated with the address identified by the previous contents of candidate tag 510 associated with the active stack which now becomes the new entry 503 associated with the active stack. In one embodiment, the data in the entry 502 which is the least recently used element of the congruence class is replaced with the data associated with the address identified by the contents of candidate tag 510 which is now considered to be the most recently used element of the congruence class. When the in-use bit 508 has a value of "0" and the address requested by processor 101 is the same address identified in candidate tag 510, then processor 101 has requested this particular address a second time whose data was not stored in cache 500. When processor 101 requests an address whose data is not stored in cache 500 a second time, then processor 101 may evict data stored in the active stack in data array 501 and insert the data identified by candidate tag 510 associated with the active stack into the least recently used entry 502 in the active stack in data array 501. In this manner, data will not be evicted from cache 500 unless there is a significant probability that the data placed in cache 500 will likely be accessed again. Hence, data may not be evicted by processor 101 by data that will not be reused, such as in an interrupt routine.

In step 614, cache 500 resets in-use bit 508, associated with the least recently used entry 502 in the active stack (located at the bottom of the active stack), to a value of "0." Only in-use bit 508 associated with the least recently used entry 502 is reset to the value of "0" as it is assumed that the data located in the entries 502 prior to the least recently used entry 502 in the active stack was accessed prior to the data located in the least recently used entry 502.

It is noted that method 600 may include other and/or additional steps that, for clarity, are not depicted. It is further noted that method 600 may be executed in a different order presented and that the order presented in the discussion of FIG. 6 is illustrative. It is further noted that certain steps in method 600 may be executed in a substantially simultaneous manner.

In addition to the principles of the present invention improving the performance of a cache, e.g., direct-mapped, n-way set associative, by not evicting data that would have been replaced with data not to be reused, such as data from an interrupt routine, the principles of the present invention may be used to detect cache thrashing.

Cache thrashing may refer to the scenario of when processor 101 executes a relatively large loop of instructions where the loop of instructions contains alternating instructions such that a candidate tag 301, 510 is being replaced with alternating tags. For example, tag #1 identifying address #1 is inserted in candidate 301, 510 at clock cycle #1. The next time candidate tag 301, 510 is accessed; tag #2 identifying address #2 is inserted in candidate tag 301, 510. Following the update, the next time candidate tag 301, 510 is accessed, tag #1 identifying address #1 is inserted into candidate tag 301, 510 and so forth. Hence, cache thrashing may cause candidate 301, 510 to continually be updated and hence never indicate a time to evict and insert data in the cache. Cache threshing may be at least in part be solved by including a "candidate counter" as discussed below in conjunction with FIG. 7.

FIG. 7—Candidate Counter

FIG. 7 is an embodiment of the present invention of a candidate counter 701 associated with a candidate 301, 510. In one embodiment, each candidate tag 301 in cache 200 (FIG. 2) or each candidate tag 510 in cache 500 (FIG. 5) may be associated with a candidate counter 701. Counter 701 may be configured to count the number of consecutive times the contents of candidate tag 301, 510 are replaced. A method for improving the performance of an n-way set associative cache 500 by not evicting data that would have been replaced with data not to be reused such as data from an interrupt routine as well as detecting cache threshing is described below in conjunction with FIG. 8. It is noted that the principles of the present invention described in FIG. 8 may be applied to direct-mapped cache 200 but were not discussed in detail for the sake of brevity.

FIG. 8—Method for Improving the Performance of an N-Way Set-Associative Cache While Detecting Cache Threshing FIG. 8 is a flowchart of one embodiment of the present invention for a method 800 for improving the performance of n-way set-associative cache 500 (FIG. 5) by not evicting data in n-way set associative cache 500 that would have been replaced with data not to be reused, such as data from an interrupt routine, as well as detecting cache threshing.

Referring to FIG. 8, in conjunction with FIGS. 1–3 and 5, in step 801, n-way set-associative cache 500 is loaded with valid data. That is, upon initialization, data array 501 in cache 500 may be loaded with valid data as the initial requests are cache misses thereby causing data to be retrieved from memory 105 and loaded into cache 500. In one embodiment, each in-use bit 508 associated with each entry 502 in each data array 501 may be pre-set with a logical value of "1," upon loading cache 500 with valid data.

In step 802, cache 500 receives a request of an address of data from processor 101. In step 803, cache 500 determines if the data of the address requested is located in cache 500. That is, in step 803, cache 500 determines if there is a cache hit.

If there is a cache hit, then, in step 804, cache 500 sets in-use bit 508, associated with entry 502 containing the data of the address requested by processor 101, to a logical value of "1." In step 805, the stack or row, which represents the congruence class of the stack or row containing the data address requested by processor 101, is updated. In one embodiment, the LRU element associated with the stack or row (congruence class) for the data requested by processor 101 is updated to reflect which of the element of the congruence class has been least recently used. For example, referring to FIG. 5, if processor 101 requested data stored in entry 502F, then the LRU for that congruence class would be updated to indicate that the data contained in entry 502A contained the least recently used element. In step 806, cache 500 resets candidate counter 701 to zero.

If, however, the data requested by processor 101 is not located in cache 500 (a cache miss), then, in step 807, cache 500 makes a determination if the requested address is the same as the contents of candidate tag 510 for the active stack or row. That is, cache 500 makes a determination if the address requested by processor 101 is identified by the tag stored in candidate tag 510 associated with the active stack.

If the requested address is not the same as the contents of candidate tag 510 associated with the active stack, then, in step 808, cache 500 determines if the value of candidate counter 701 is equal to a maximum value. If the value of candidate counter 701 does not equal the maximum value, then, in step 809, the contents of candidate tag 510 associated with the active stack is replaced with the tag that identifies the address requested by processor 101. In this manner, candidate tag 510 stores the tag that identifies the last address requested by processor 101 not stored in cache 500. In step 810, cache 500 updates candidate counter 701. For example, cache 500 may increment candidate counter 701 by one indicating that the tag stored in candidate tag 510 was replaced. In step 811, cache 500 resets in-use bit 508, associated with the least recently used entry 502 in the active stack (located at the bottom of the active stack), to a value of "0." Only in-use bit 508 associated with the least recently used entry 502 is reset to the value of "0" as it is assumed that the data located in the entries 502 prior to the least recently used entry 502 in the active stack was accessed prior to the data located in the least recently used entry 502.

If, however, the value of candidate counter 701 equals the maximum value, then, in step 812, cache 500 loads the tag stored in candidate tag 510 associated with the active stack into entry 504 associated with the active stack.

In step 813, cache 500 loads the previous active tag (tag stored in entry 504 associated with the active stack) into candidate tag 510 associated with the active stack.

In step 814, the current data element in cache 500 is replaced with the data associated with the address identified by the previous contents of candidate tag 510 which now becomes the new entry 503 associated with the active stack. In one embodiment, the data in the entry 502 located in the least recently used position of the active stack is replaced with the data associated with the address identified by the contents of candidate tag 510 associated with the active stack which is now considered the most recently used element of the associated congruence class. When the in-use bit 508 has a value of "0" and the address requested by processor 101 is the same address identified in candidate tag 510 associated with the active stack, then processor 101 has requested this particular address a second time whose data was not stored in cache 500. When processor 101 requests an address whose data is not stored in cache 500 a second time, then processor 101 may evict data stored in the active stack in data array 501 and insert the data identified by candidate tag 510 associated with the active stack into the least recently used entry 502 in the active stack in data array 501. In this manner, data will not be evicted from cache 500 unless there is a significant probability that the data placed in cache 500 will likely be accessed again. Hence, data may not be evicted by processor 101 by data that will not be reused, such as in an interrupt routine.

In step 815, cache 500 resets in-use bit 508, associated with the least recently used entry 502 in the active stack (located at the bottom of the active stack), to a value of "0." Only in-use bit 508 associated with the least recently used entry 502 is reset to the value of "0" as it is assumed that the data located in the entries 502 prior to the least recently used entry 502 in the active stack was accessed prior to the data located in the least recently used entry 502.

In step 816, cache 500 resets candidate counter 701 to zero since the contents of candidate tag 510 associated with the active stack was replaced.

Referring to step 807, if, however, the requested address is the same as the contents of candidate tag 510 associated with the active stack, then, in step 817, cache 500 determines if the in-use bit 508 associated with the least recently used entry 502 in the active stack is equal to the logical value of "1." If in-use bit 508 is equal to the logical value of "1," then, in step 818, cache 500 resets in-use bit 508, associated with the least recently used entry 502 in the active stack (located at the bottom of the active stack), to a value of "0." As stated above, when in-use bit 508 contains a logical value of "1," then a cache hit has occurred since the last time candidate tag 510 associated with the active stack has been checked. Since a cache hit has occurred since the last time candidate tag 510 associated with the active stack has been checked, cache 500 may reset in-use bit 508 associated with the active stack to the value of "0" to determine if processor 101 will request the address identified by the tag stored in candidate tag 510 for a second time. In step 819, cache 500 resets candidate counter 701 to zero since the contents of candidate tag 510 associated with the active stack were not replaced.

If, however, in-use bit 508 associated with the least recently used entry 502 in the active stack is equal to the logical value of "0," then, in step 812, cache 500 loads the tag stored in candidate tag 510 associated with the active stack into entry 504 associated with the active stack.

In step 813, cache 500 loads the previous active tag (tag stored in entry 504 associated with the active stack) into candidate tag 510 associated with the active stack.

In step 814, the current data element in cache 500 is replaced with the data associated with the address identified by the contents of candidate tag 510 associated with the active stack. In one embodiment, the data in the entry 502 located in the least recently used position of the active stack is replaced with the data associated with the address identified by the contents of candidate tag 510. When the in-use bit 508 has a value of "0" and the address requested by processor 101 is the same address identified in candidate tag 510, then processor 101 has requested this particular address a second time whose data was not stored in cache 500. When processor 101 requests an address whose data is not stored in cache 500 a second time, then processor 101 may evict data stored in the active stack in data array 501 and insert the data identified by candidate tag 510 into the least recently used entry 502 in the active stack in data array 501. In this manner, data will not be evicted from cache 500 unless there is a significant probability that the data placed in cache 500 will likely be accessed again. Hence, data may not be evicted by processor 101 by data that will not be reused such as in an interrupt routine.

In step 815, cache 500 resets in-use bit 508, associated with the least recently used entry 502 in the active stack (located at the bottom of the active stack), to a value of "0."

Only in-use bit 508 associated with the least recently used entry 502 is reset to the value of "0" as it is assumed that the data located in the entries 502 in the active stack prior to the least recently used entry 502 was accessed prior to the data located in the least recently used entry 502.

In step 816, cache 500 resets candidate counter 701 to zero since the contents of candidate tag 510 associated with the active stack was replaced.

It is noted that method 800 may include other and/or additional steps that, for clarity, are not depicted. It is further noted that method 800 may be executed in a different order presented and that the order presented in the discussion of FIG. 8 is illustrative. It is further noted that certain steps in method 800 may be executed in a substantially simultaneous manner.

Although the system and method are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

What is claimed is:

1. A method for improving the performance of a cache comprising the steps of:
   receiving a request of an address of data;
   determining if said requested data is located in said cache;
   determining if said requested address is associated with contents of a first tag if said requested data is not located in said cache; and
   replacing a data element in said cache using said contents of said first tag if said requested address is associated with said contents of said first tag and if a bit associated with said first tag is in a first state, wherein said bit associated with said first tag is in said first state if said contents of said first tag were previously requested and not located in said cache.

2. The method as recited in claim 1 further comprising the step of:
   setting said bit associated with said first tag to a second state if said requested data is located in said cache.

3. The method as recited in claim 1 further comprising the step of:
   replacing said contents of said first tag with contents of a second tag if said requested address is not associated with said contents of said first tag.

4. The method as recited in claim 3 further comprising the step of:
   resetting said bit associated with said first tag to said first state if said requested address is not associated with said contents of said first tag.

5. The method as recited in claim 1 further comprising the step of:
   resetting said bit associated with said first tag to said first state if said requested address is associated with said contents of said first tag and if said bit associated with said first tag is in a second state.

6. The method as recited in claim 1 further comprising the step of:
   loading contents of a second tag into said contents of said first tag if said requested address is associated with said contents of said first tag and said bit associated with said first tag is in a second state.

7. The method as recited in claim 6 further comprising the step of:
   resetting said bit associated with said first tag to said first state if said requested address is associated with said contents of said first tag.

8. The method as recited in claim 1 further comprising the step of:
   loading said contents of said first tag into contents of a second tag if said requested address is associated with said contents of said first tag and said bit associated with said first tag is in a second state.

9. The method as recited in claim 1 further comprising the step of:
   determining if a counter equals a maximum value if said requested address is not associated with said contents of said first tag, wherein said counter tracks a number of times said contents of said first tag is replaced without being reset.

10. The method as recited in claim 9 further comprising the step of:
    updating said counter if said counter does not equal said maximum value.

11. A system, comprising:
    a processor, wherein said processor has a cache memory associated with it;
    a system memory for storing data of said processor;
    a bus system coupling said processor to said system memory;
    wherein said cache memory comprises:
      a first tag storing an indication of an address previously requested by said processor not stored in said cache memory;
      logic for receiving a request of an address of data from said processor;
      logic for determining if said requested data is located in said cache memory;
      logic for determining if said requested address is associated with contents of said first tag if said requested data is not located in said cache; and
      logic for replacing a data element in said cache using said contents of said first tag if said requested address is associated with said contents of said first tag and if a bit associated with said first tag is in a first state, wherein said bit associated with said first tag is in said first state if said contents of said first tag were previously requested and not located in said cache.

12. The system as recited in claim 11, wherein said cache memory further comprises:
    logic for setting said bit associated with said first tag to a second state if said requested data is located in said cache.

13. The system as recited in claim 11, wherein said cache memory further comprises:
    logic for replacing said contents of said first tag with contents of a second tag if said requested address is not associated with said contents of said first tag, wherein said second tag is associated with a data element in said cache memory.

14. The system as recited in claim 13, wherein said cache memory further comprises:
    logic for resetting said bit associated with said first tag to said first state if said requested address is not associated with said contents of said first tag.

15. The system as recited in claim 11, wherein said cache memory further comprises:
    logic for resetting said bit associated with said first tag to said first state if said requested address is associated with said contents of said first tag and if said bit associated with said first tag is in a second state.

16. The system as recited in claim 11, wherein said cache memory further comprises:

logic for loading contents of a second tag into said contents of said first tag if said requested address is associated with said contents of said first tag and said bit associated with said first tag is in a second state, wherein said second tag is associated with a data element in said cache memory.

17. The system as recited in claim 16, wherein said cache memory further comprises:

logic for resetting said bit associated with said first tag to said first state if said requested address is associated with said contents of said first tag.

18. The system as recited in claim 11, wherein said cache memory further comprises:

logic for loading said contents of said first tag into contents of a second tag if said requested address is associated with said contents of said first tag and said bit associated with said first tag is in a second state, wherein said second tag is associated with a data element in said cache memory.

19. The system as recited in claim 11, wherein said cache memory further comprises:

logic for determining if a counter equals a maximum value if said requested address is not associated with said contents of said first tag, wherein said counter tracks a number of times said contents of said first tag is replaced without being reset.

20. The system as recited in claim 19, wherein said cache memory further comprises:

logic for updating said counter if said counter does not equal said maximum value.

* * * * *